US009614896B2

(12) United States Patent
Broz et al.

(10) Patent No.: US 9,614,896 B2
(45) Date of Patent: Apr. 4, 2017

(54) DISPLAYING USER'S DESIRED CONTENT BASED ON PRIORITY DURING LOADING PROCESS

(71) Applicant: INTERNATIONAL BUSINESS MACHINES CORPORATION, Armonk, NY (US)

(72) Inventors: Michal Broz, Austin, TX (US); Bernadette A. Carter, Raleigh, NC (US); Melba I. Lopez, Austin, TX (US); Matthew G. Marum, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 273 days.

(21) Appl. No.: 13/895,757

(22) Filed: May 16, 2013

(65) Prior Publication Data

US 2014/0344351 A1    Nov. 20, 2014

(51) Int. Cl.
*G06F 15/16* (2006.01)
*H04L 29/08* (2006.01)
*G06F 9/44* (2006.01)
*G06F 9/445* (2006.01)

(52) U.S. Cl.
CPC .............. *H04L 67/10* (2013.01); *G06F 9/445* (2013.01); *G06F 9/4443* (2013.01)

(58) Field of Classification Search
CPC ....... H04L 67/10; H04L 29/06; H04L 65/403; G06F 17/22
USPC ........................................................ 709/204
See application file for complete search history.

(56) References Cited

U.S. PATENT DOCUMENTS

| 5,781,894 | A | 7/1998 | Petrecca et al. |
| 5,996,007 | A | 11/1999 | Klug et al. |
| 6,304,852 | B1 | 10/2001 | Loncteaux |
| 8,769,008 | B1* | 7/2014 | Young ............ H04W 4/02 709/201 |
| 9,037,681 | B2* | 5/2015 | McConnell ........ G06Q 10/109 705/319 |
| 2002/0135617 | A1* | 9/2002 | Samid ................. G09G 5/14 715/764 |
| 2005/0022165 | A1* | 1/2005 | Ruff .............................. 717/121 |
| 2005/0091395 | A1* | 4/2005 | Harris et al. ................. 709/232 |
| 2007/0150342 | A1* | 6/2007 | Law et al. ..................... 705/14 |
| 2008/0026694 | A1* | 1/2008 | Ramanathan ...... H04N 5/44508 455/39 |
| 2008/0059571 | A1 | 3/2008 | Khoo |
| 2008/0071929 | A1* | 3/2008 | Motte et al. .................. 709/246 |
| 2008/0109749 | A1 | 5/2008 | Kraft et al. |
| 2008/0162658 | A1* | 7/2008 | Reponen ....................... 709/207 |

(Continued)

*Primary Examiner* — Nicholas Taylor
*Assistant Examiner* — Meng Vang
(74) *Attorney, Agent, or Firm* — Scully, Scott, Murphy & Presser, P.C.; Dermott Cooke

(57) ABSTRACT

There are provided a method, a system and a computer program product for customizing a loading message to be displayed during a loading process. The system receives, from a client device used by a user, an event message that indicates a start of the loading process. The system receives, from the client device, one or more content sources. The system selects a content source among the one or more content sources. The system displays content from the selected content source to the user during the loading process.

20 Claims, 7 Drawing Sheets

(56) References Cited

U.S. PATENT DOCUMENTS

| | | | |
|---|---|---|---|
| 2008/0228548 A1* | 9/2008 | McBrearty | G06F 17/30622 |
| | | | 705/7.24 |
| 2009/0063263 A1* | 3/2009 | Krantz | G06Q 30/02 |
| | | | 705/14.65 |
| 2010/0248755 A1* | 9/2010 | Vance | H04M 1/72583 |
| | | | 455/466 |
| 2010/0275196 A1 | 10/2010 | Peterson | |
| 2011/0131296 A1* | 6/2011 | Lee et al. | 709/219 |
| 2012/0079361 A1* | 3/2012 | Itoko et al. | 715/205 |
| 2014/0025620 A1* | 1/2014 | Greenzeiger | G06F 17/30702 |
| | | | 706/47 |

* cited by examiner

DISPLAYING USER'S DESIRED CONTENT BASED ON PRIORITY DURING LOADING PROCESS

BACKGROUND

This disclosure relates generally to a loading process, and particularly to displaying a customized loading message during a loading process.

BACKGROUND OF THE INVENTION

Computing systems download, upload, install, and/or open electronic files and perform various other tasks. A loading message refers to herein a screen or message displayed during a loading process. Currently, loading messages have been based on what the software producer desires for users to see, for example, a status of a downloading, uploading or installing process, an advertisement(s) for other product(s), and information for how to use a software product being installed or downloaded.

SUMMARY

A method, a system and a computer program product are provided for customizing a loading message to be displayed during a loading process. The system receives, from a client device used by a user, an event message that indicates a start of the loading process. The system receives, from the client device, one or more content sources. The system selects a content source among the one or more content sources. The system displays content from the selected content source to the user during the loading process.

In order to receive the one or more content sources, the system enables the user to choose the one or more content sources. The system enables the user to register the one or more chosen source contents to a computing system associated with the loading process or an external service associated with the loading process.

BRIEF DESCRIPTION OF THE DRAWINGS

These and other objects, features and advantages of the present invention will become apparent from the following detailed description of illustrative embodiments thereof, which is to be read in connection with the accompanying drawings, in which.

DETAILED DESCRIPTION

There is provided a method, a system and a computer program product for customizing a loading message to be displayed during a loading process. Currently, users are not allowed to customize a loading message to be displayed during a loading process. A loading process may include one or more of: (1) uploading a file from a client device to a computing system; (2) downloading a file into the client device; (3) installing software in the client device; (4) booting up the client device; (5) loading a web page in the client device; any other idle time of the client device; (6) opening a software application in the client device; (7) performing a task (e.g., self-diagnostic, software update, etc.), in the client device, which does not allow a user to interact with the client device or a software application which performs the task; or (8) any other task that can be performed in the system of the client device.

Figure 1:
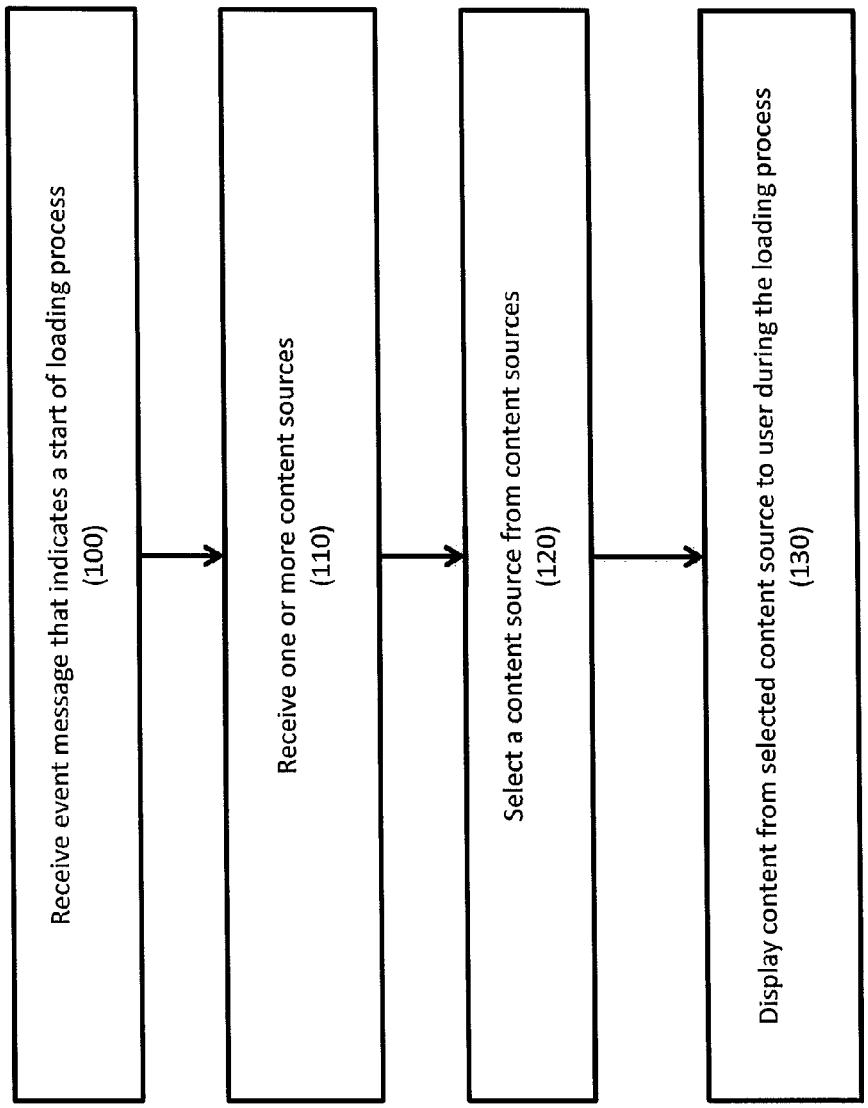
FIG. 1 illustrates a flowchart that describes a method for customizing a loading message to be displayed during a loading process.
Figure 2:
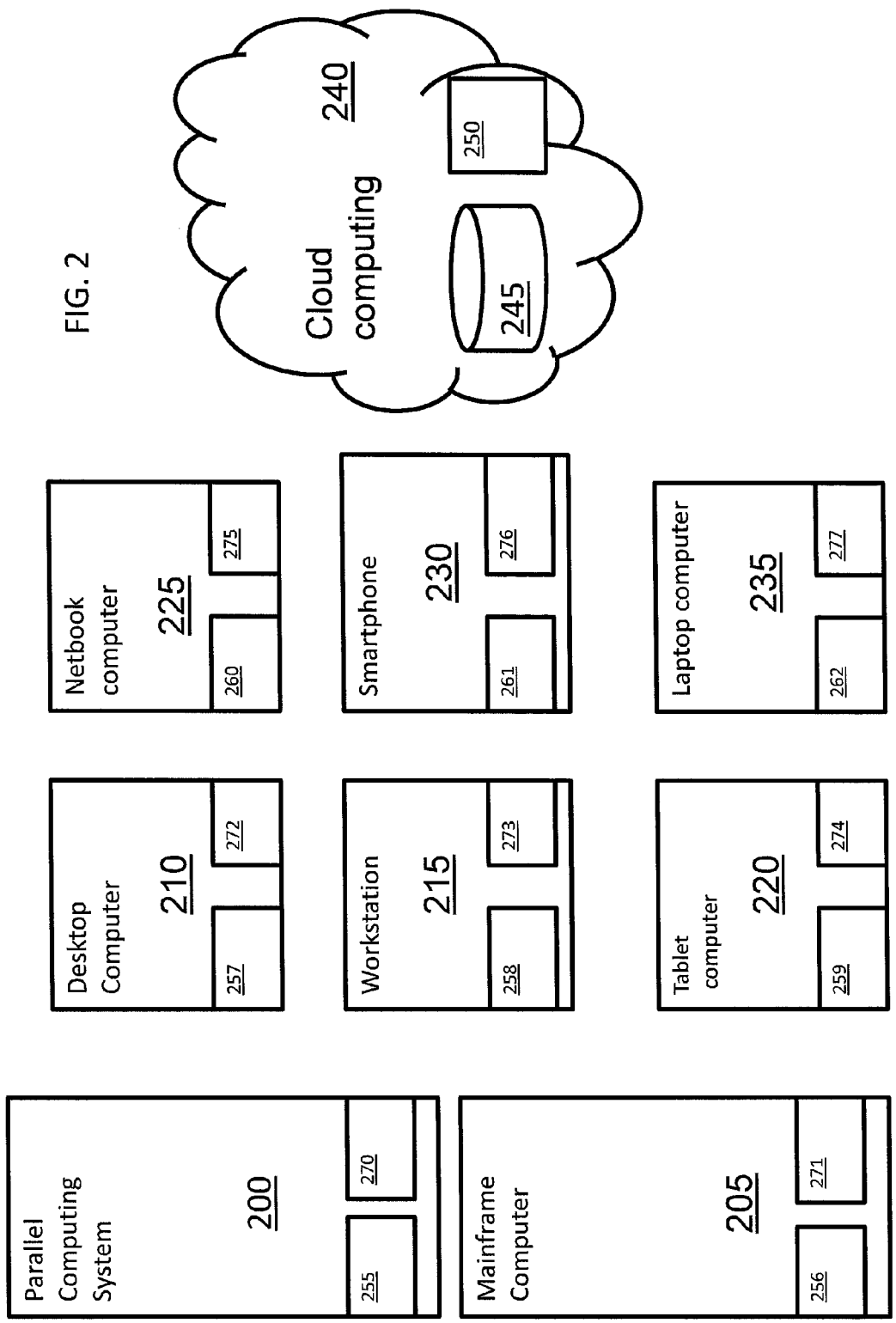
FIG. 2 illustrates examples of a computing system that can run the methods illustrated in FIGS. 1 and 3-5.

FIG. 2 illustrates examples of a client device or computing system. These example client devices (or example computing systems) may include, but are not limited to: a parallel computing system 200 including at least one processor 255 and at least one memory device 270, a mainframe computer 205 including at least one processor 256 and at least one memory device 271, a desktop computer 210 including at least one processor 257 and at least one memory device 272, a workstation 215 including at least one processor 258 and at least one memory device 273, a tablet computer 220 including at least one processor 259 and at least one memory device 274, a netbook computer 225 including at least one processor 260 and at least one memory device 275, a smartphone 230 including at least one processor 261 and at least one memory device 276, a laptop computer 235 including at least one processor 262 and at least one memory device 277, or a cloud computing system 240 including at least one storage device 245 and at least one server device 250. In one embodiment, the client device and the computing system are separate machines. In another embodiment, the client device and the computing system are the same machine. In this embodiment, methods illustrated in FIGS. 1 and 3-7 are implemented in that same machine.

FIG. 1 illustrates a flowchart that describes a method for customizing a loading message to be displayed during a loading process. At 100, a computing system receives, from a client device used by a user, an event message that indicates a start of the loading process. FIG. 2 illustrates examples of the computing system. In one embodiment, in order to initiate a loading process, the user who uses the client device selects, for example, a graphical button or any other user interface that may display "start download," "start upload," or "start installation," or any other similar message, e.g., by using an input control device. The computing system may receive the event message, e.g., by using a hook mechanism by which a selection action can be intercepted by the computing system. For example, by using WH_MOUSE hook, the computing system may be able to monitor one or more message from an input control device(s) of the client device.

At 110, the computing system receives, from the client device, one or more content sources. Content sources include, but are not limited to: (1) an email client software; (2) at least one social network or at least one microblog post; (3) at least one web site that provides one or more video clips or one or more audio clips; (4) at least one blog site; (5) at least one document repository, e.g., a database; (6) a software application or a file in a client device at which a loading process is initiated by a user; or (7) at least one web site associated with the user, e.g., one or more web sites bookmarked by the user or any other web site.

In order to receive the one or more content sources, the computing system enables the user to choose the one or more content sources, e.g., by providing a graphical user interface that displays a plurality of content sources. The computing system enables the user to register the one or more chosen content sources to, for example, a database of the computing system or an external service which is accessed by a software application being loaded. The database may store registered content sources and identifiers of corresponding users. In one embodiment, an administrative program, e.g., an operating system, etc., of the computing system may control the registration process of the one or more content sources. The administrative program of the computing system may limit the user to register content sources only related to work of the user, e.g., by asking the user to enter an identifier of a work which may be related to a content source when the user attempts to register that content source.

Figure 6:
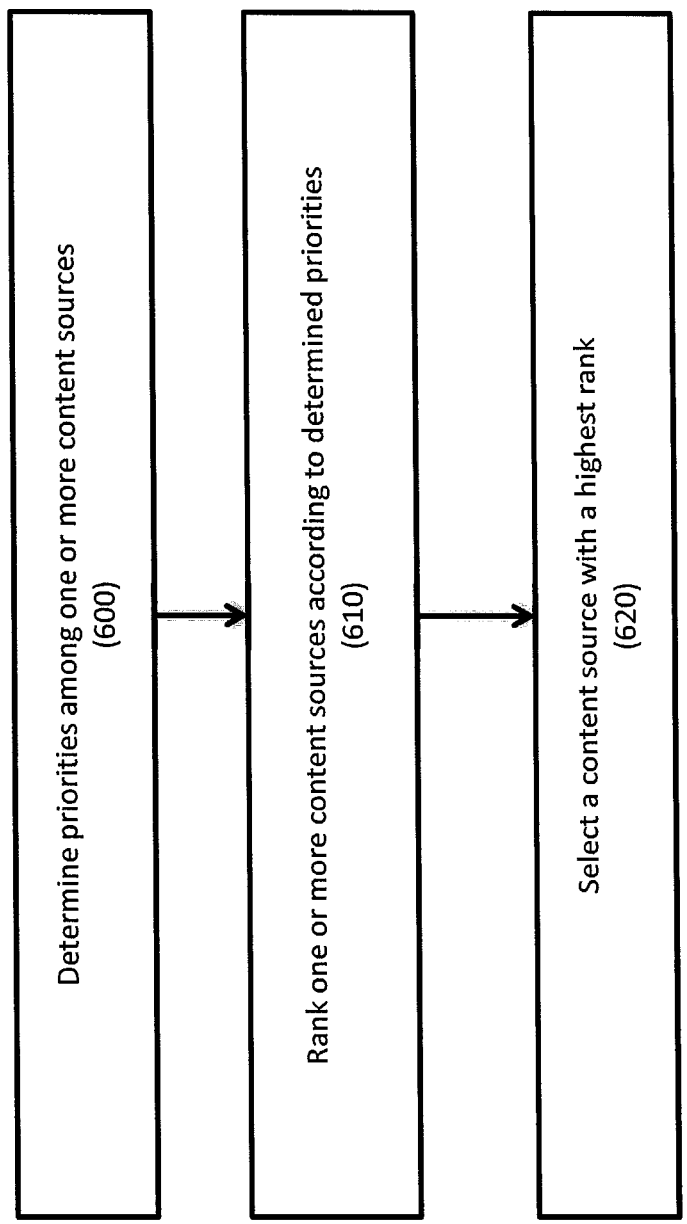
FIG. 6 illustrates another method for selecting a content source among one or more contents sources.

At 120, the computing system selects a content source among the one or more content sources. FIG. 6 illustrates a flowchart that describes a method for selecting a content source among the one or more content sources. At 600, the computing system determines priorities among the one or more content sources. In one embodiment, the user determines the priorities among the one or more content sources. In another embodiment, the computing system determines the priorities among the one or more content sources based on one or more of: (1) a subject of the loading process; (2) an upcoming meeting associated with the user; (3) an upcoming deadline associated with the user; (4) user's pattern that the user accesses one or more of the content sources; (5) one or more content sources provided to other users during the same loading process; (6) time sensitivity associated with the one or more content sources; (7) an association with a current event; or (8) popularity of content from a corresponding content source.

The computing system may determine the subject of the loading process based on one or more of: (A) a usage of a file being downloaded, uploaded or installed; (B) an action that needs to be taken by the user during the loading process or after the loading process; or (C) information that needs to be known to the user. If one or more of other users is willing to share his registered content sources, the computing system may be able to determine one or more content sources provided to other users during the same loading process. The computing system may be able to provide one or more content from the similar or same content sources (i.e., the content sources provided to the other users) to the user during the same loading process. The computing system may determine the upcoming meeting and the upcoming deadlines, e.g., from an electronic calendar associated with the user if the computing system can access the electronic calendar of the user. The computing system detects the user's pattern of accesses to one or more of the content sources based on, e.g., by a web browsing history, etc. Browser history may indicate that the user usually accesses a news web site in the Morning and may further indicate that the user normally accesses a social network site during a lunch hour, etc. The computing system may determine time sensitivity of content, e.g., based on a characteristic of the content. For example, email client software may have more time sensitivity than a web site that provides one or more video clips or audio clips because one or more emails from the email client software may indicate a high priority. The computing system may determine the association with a current event based on, e.g., whether a corresponding content source provides news stories, etc. The computing system may determine the popularity of content based on, e.g., the number of users who accesses the corresponding content source daily.

At 610, the computing system ranks the one or more content sources according to determined priorities. For example, assume that an electronic calendar is accessible to the computing system. Further assume that the computing system sets an upcoming event in the electronic calendar associated with the user as having the highest priority. Then, in this example, the computing system may identify keywords, e.g., titles, etc., associated with the upcoming event available in the electronic calendar, e.g., by using a content analysis and text mining tool that can perform a keyword identification and a content analysis on an electronic document. The computing system searches those keywords in contents from the one or more content sources, e.g., by using a search feature. The computing system ranks the one or more content sources according to the number of keywords found in corresponding contents: a content source whose content includes those keywords at the highest number may achieve the highest rank. At 620, the computing system selects a content source with the highest rank. If a content source achieves the highest rank, the computing system may also set the content source as a content source with the highest priority.

Figure 3:
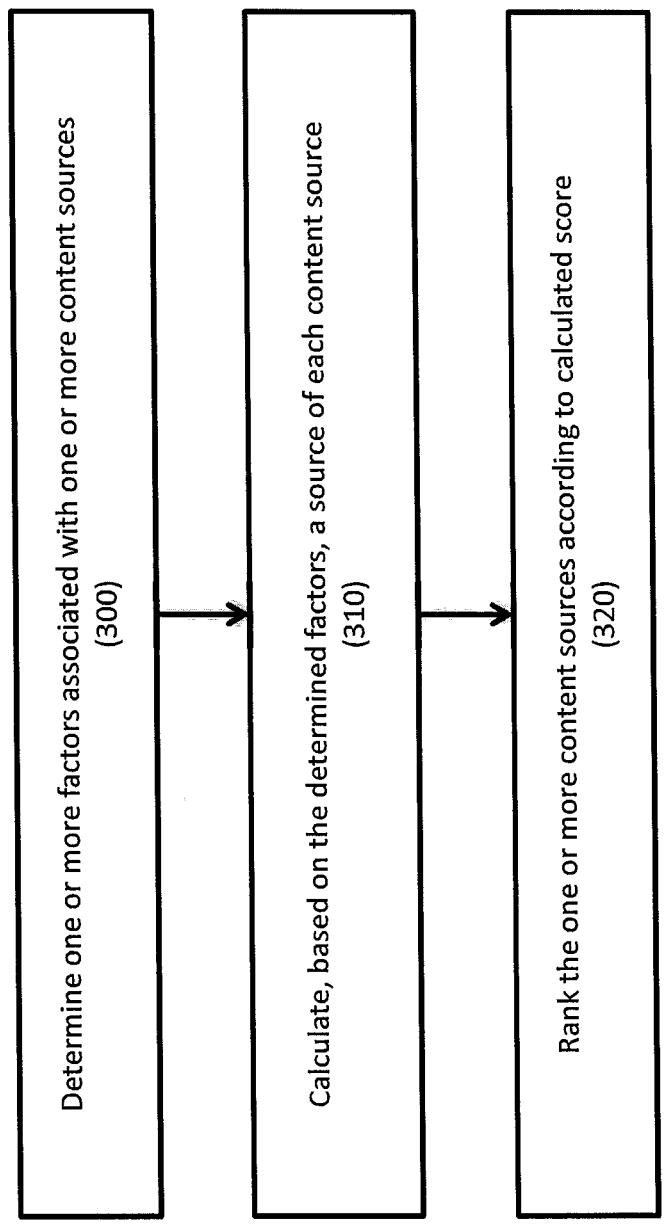
FIG. 3 illustrates a method for selecting a content source among one or more contents sources.

FIG. 3 illustrates another method to select a content source among the one or more content sources. At 300, the computing system determines one or more factors associated with the one or more content sources. The factors may include, but are not limited to: a time period available for displaying a content, user's reading speed, the priorities among the one or more content sources, complexity of the one or more contents, user's reading habits, mood or health state of the user, or contents being viewed by other users. In one embodiment, the other users are social network contacts of the user who initiated the loading process at 100 in FIG. 1.

Figure 5:
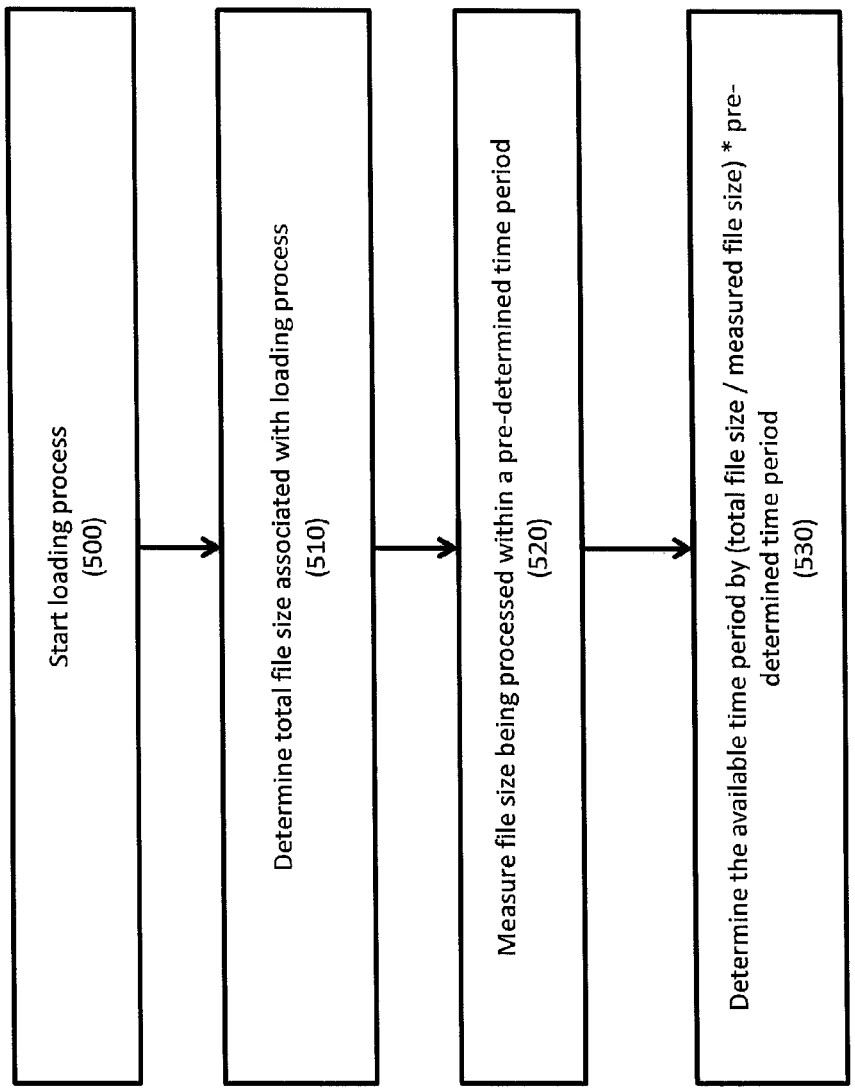
FIG. 5 illustrates a method for determining a time period available for displaying content from a selected content source.

FIG. 5 illustrates an example method for determining the time period available for displaying content. At 500, the computing system starts the loading process, e.g., right after receiving an event message that the user selects, for example, a button associated with a start of the loading process or any other indication that the loading process is initiated. At 510, the computing system determines a total file size associated with the loading process. For example, a database (not shown) associated with the computing system may store a table that describes total file sizes and identifiers of corresponding loading processes. By accessing this table, the computing system may be able to determine a total file size associated with a corresponding loading process. At 520, the computing system measures a file size being processed (e.g., downloaded, uploaded or installed, etc.) during a pre-determined time period, e.g., 1 second etc., of the loading process. At 530, the computing system determines the available time period by computing (the total file size÷the measured file size)×the pre-determined time period.

Figure 7:
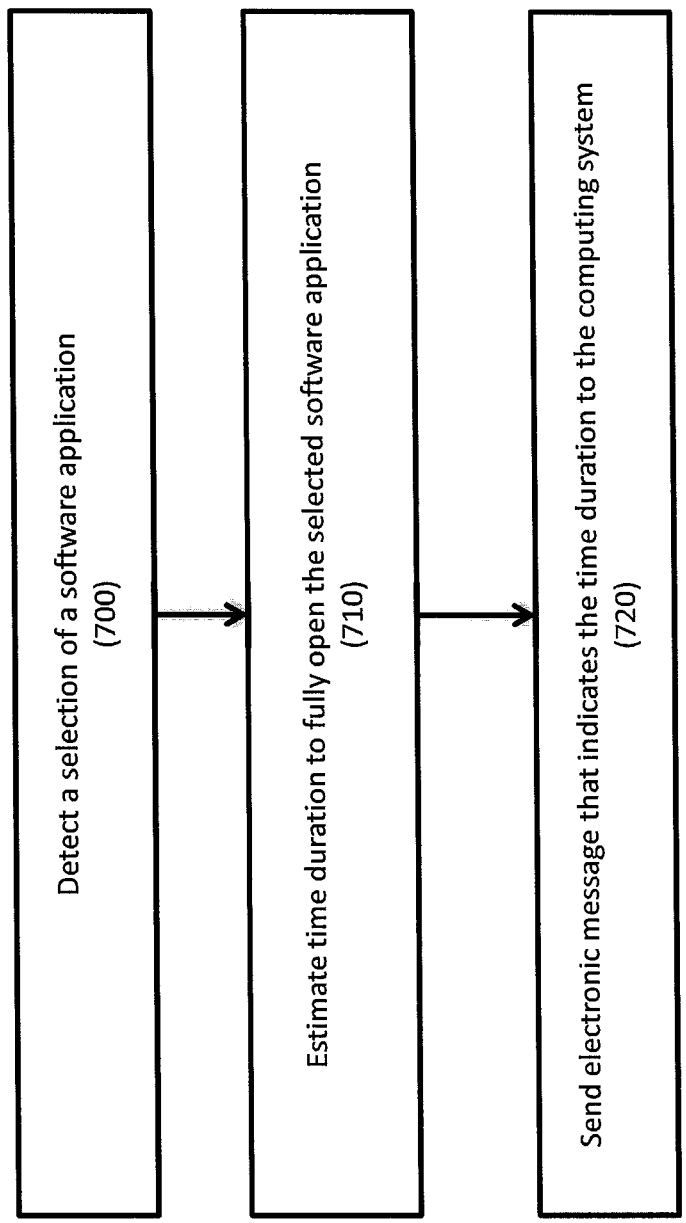
FIG. 7 illustrates another method for determining a time period available for displaying content from a selected content source.

FIG. 7 illustrates another example method for determining the time period available for displaying content. At 700, the client device detects that the user selects, e.g., by using an input control device, software application in order to open the software application in the client device. At 710, the client device estimates time duration to fully open the selected software application in the client device, e.g., based on a current CPU (Central Processing Unit) usage and a current memory usage of the client device. At 720, the client device sends an electronic message that indicates the estimated time duration to the computing system.

As another example, the client device may receive, from a software provider, an electronic notification that indicates one or more of: (1) a software update of a software application installed in the client device; or (2) a recommendation to run a self-diagnostic on the client device in order to make sure that the client device functions properly. The client device determines an estimated time duration that may take to complete the software update or the self-diagnostic on the client device, e.g., based on one or more of: (a) a current CPU (Central Processing Unit) usage of the client device, (b) a current memory usage of the client device, (c) a network bandwidth associated with client device, or (d) a total file size associated with the software update or the self-diagnostic. The client device sends an electronic message that indicates the estimated time duration to the computing system. Other methods may be used to determine the available time period.

In order to determine the user's reading speed, the client device detects that the user opens up one or more electronic documents available in the client device. The client device detects one or more input events, e.g., flicking a finger from right to left on a touch screen of the client device, that change page numbers of the one or more electronic documents. The computing system determines time differences between the detected input events. The computing system calculates an average of the time differences. The average of the time differences may be used as the user's reading speed.

In order to determine the complexity of the content, the computing system runs a content analysis tool or any other similar tool on one or more contents from the one or more content sources. In order to determine the user's reading habits, the computing system detects when the user accesses each of the one or more content sources, e.g., by using a web browsing history or any other similar technique. In order to determine the mood and health state of the user, the computing system detects, by using a mood and health scanner or any other similar tool, the mood and health state of the user. Alternatively, the computing system determines the mood and health state of the user, e.g., based on how well a corresponding loading process goes. For example, if the computing system detects that the user repeats certain steps in the loading process, the computing system determines that this repetition of those steps may affect a current mood of the user, e.g., by decreasing a current happiness level of the user.

Figure 4:
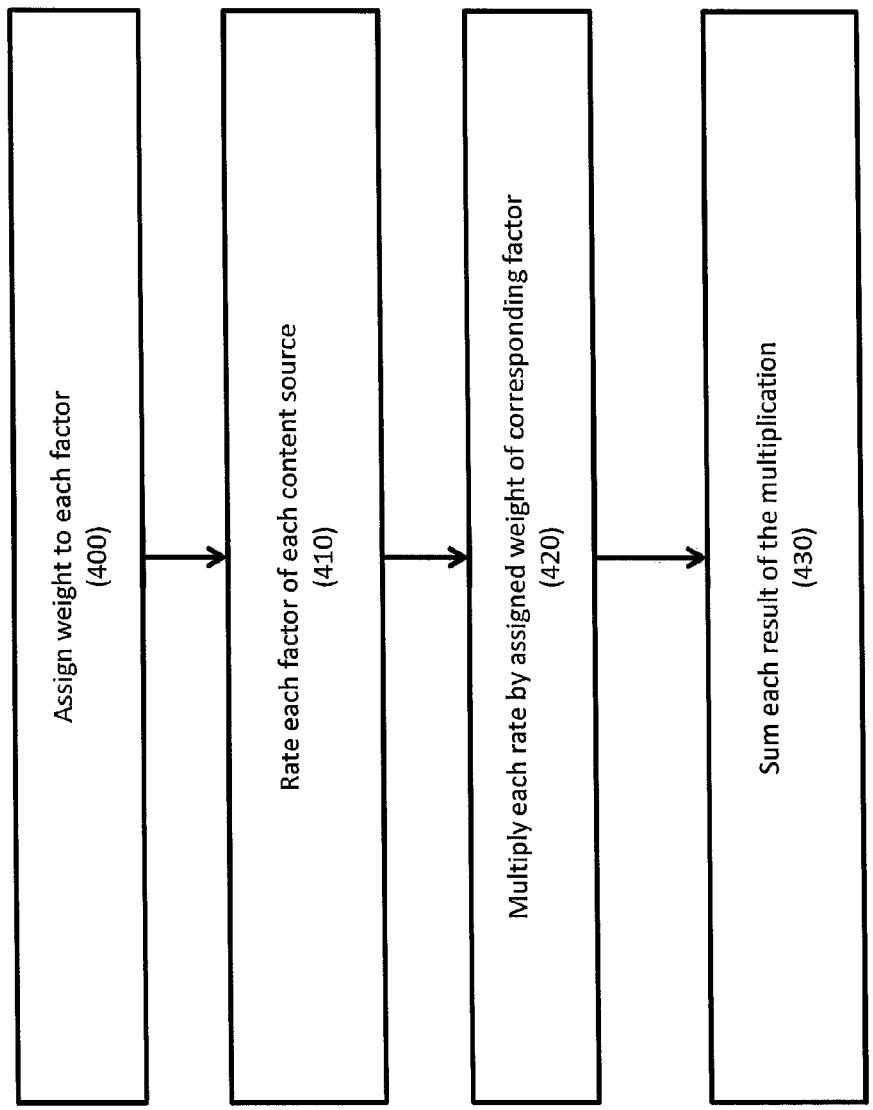
FIG. 4 illustrates a method for calculating a score of each content source.

Returning to FIG. 3, at 310, the computing system calculates, based on the determined factors, a score of each content source. FIG. 4 illustrates a method for calculating a score of each content source. At 400, the computing system assigns a weight to each factor. In one embodiment, the computing system may assign a same weight, e.g., 10, to each factor. In another embodiment, the computing system may assign a different weight to each factor. At 410, the computing system rates each factor of each content source. For example, content from a content source can be completely consumed during the available time period (i.e., a time period that may take from a start of a corresponding loading process to a completion of the corresponding loading process), the computing system rates that content source at a highest point, e.g., 10. In another example, if a content from another content source includes a negative viewpoint on, for example, the subject of the loading process, the computing system may rate the another content source at a lowest point, e.g., zero. For example, the computing system may store, e.g., its storage device, etc., a list of content sources which are known for posting negative information (e.g., complaints, etc.) of the software or the file. In this example, the computing system may rate content sources listed in the list at the lowest point. In one embodiment, the computing system may not select any content source listed in the list even if the user registers a content source in the list to be a possible candidate to provide content during the loading process.

At 420, for each content source, the computing system multiplies each rating by the assigned weight of a corresponding factor. For example, assume that a first content source receives a first point, e.g., 6, for the available time period whose weight may be, for example, 10. Further assume that the first content source receives a second point, e.g., 7, for the determined priorities whose weight may be, for example, 10. The computing system may multiply the first point by the weight of the available time period and output a first multiplication result. The computing system may multiply the second point by the weight of the determined priorities and output a second result. At 430, for each content source, the computing system sums each result of the multiplication. In the above example, the computing system adds the first multiplication result, the second multiplication result, and other multiplication results associates with the first content source. A result of the addition may be the calculated score of the first content source.

Returning to FIG. 3, at 320, the computing system ranks the one or more content sources according to the calculated score. The computing system selects a content source with a highest calculated score. Alternatively, the computing system enables the user to select the content source among the one or more content sources, e.g., by providing a graphical user interface or any other user interface that the user selects a content source among the one or more content sources.

Alternatively, the computing system determines, e.g., based on prior users' electronic feedbacks, whether software or a file associated with the loading process is complicated. For example, based on his or her experience with the software or the file, a prior user of the software or the file can select, e.g., via a web site associated with the software or the file, one of: (1) a first category, e.g., "easy to use the software," (2) a second category, e.g., "modestly easy to use the software," (3) a third category, "difficult to use the software." If most of prior users' feedbacks indicate that the prior users choose the third category, e.g., "difficult to use the software," the computing system may determine that the software is complicated. If the software or file is determined to be complicated, the computing system may select a content source whose content is a light-hearted content, e.g., a sports news magazine web site which provides sports news or an entertainment news magazine web site which provides entertainment news.

Alternatively, the computing system uses a machine learning algorithm, e.g., a supervised learning algorithm, etc., in order to select a content source among the one or more content sources. For example, assume that a user normally reads news stories from a particular web site at 8 AM every Morning. Further assume that a database (not shown) associated with the computing system or a client device that the user uses stores a web browsing history of the user. Further assume that the user starts a loading process at 8 AM in the Morning a particular day. Then, right after the loading process is started, the computing system may select the particular web site as a selected content source, e.g., by running a supervised learning algorithm on the stored web browsing story.

After the computing system selects one or more content sources, e.g., by using the method shown in FIG. 3 or FIG.

6, the computing system sends a control signal to the client device that instructs the client device to access the selected content source(s), e.g., by running a remote computer control software or any other similar tool, which enables controlling of a computer remotely via Internet, on the computing system and the client device. Returning to FIG. 1, at 130, after receiving the control signal from the computing system, the client device displays content from the selected content source to the user during the loading process, e.g., via a display device of the client device. By displaying one or more content from the selected content source, the user may be able to perform multitasking, e.g., performing a loading process and at the same time reading or viewing or listening to the content from the selected content source. By performing the multitasking, the user may be able to remove one or more task from his or her to-do list. By running methods shown in FIGS. 1 and 3-6, the computing system enables the user to customize a loading message to what the user wants or needs to read or view or listen in order to optimize the use of user's times. If the software or the file associated with the loading process is complicated, by providing light-hearted content to the user, the computing system may be able to optimize the mental state of the user during a corresponding loading process.

In one embodiment, the computing system provides to one or more users a service associated with loading messages or loading screens (i.e., screens displayed during a loading process). One or more client devices, which the one or more users use, may subscribe to the service to receive the loading messages (or contents) to be displayed to the user during a corresponding loading process. A software producer that may display a loading message or screen may communicate with the computing system in order to determine the loading message or screen based on the factors or the determined priorities as described above. Users may provide one or more feedback, e.g., via an electronic message, etc., regarding of an appropriateness to content displayed during a loading process. Based on the feedback, the computing system tunes the selecting process of a content source, e.g., by suggesting same or similar content to other users during the same or similar loading process if most of the feedback was positive. In one embodiment, the computing system provides the service associated with the loading messages or loading screens to the client device, e.g., via a wireless network, a wired network, Intranet, or Internet. In one embodiment, methods illustrated in FIGS. 1 and 3-6 are implemented in the client device. In this embodiment, the content sources are registered to an operating system in the client device. The operating system in the client device may perform methods illustrated in FIGS. 1 and 3-6.

In one embodiment, the methods shown in FIGS. 1 and 3-6 may be implemented as hardware on a reconfigurable hardware, e.g., FPGA (Field Programmable Gate Array) or CPLD (Complex Programmable Logic Device), by using a hardware description language (Verilog, VHDL, Handel-C, or System C). In another embodiment, the methods shown in FIGS. 1-3, 5-6 and 8 may be implemented on a semiconductor chip, e.g., ASIC (Application-Specific Integrated Circuit), by using a semi custom design methodology, i.e., designing a semiconductor chip using standard cells and a hardware description language.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a system, apparatus, or device running an instruction.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with a system, apparatus, or device running an instruction.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for customizing a loading message to be displayed during a loading process, the method comprising:
   receiving, from a client device used by a user, an event message that indicates a start of the loading process;
   receiving, from the client device, one or more content sources;
   selecting a content source among the one or more content sources;
   determining priorities among the one or more content sources, wherein the priorities are determined based on criteria comprising at least a subject of the loading process and one or more content sources provided to other users during the same loading process; and
   displaying a content from the selected content source to the user during the loading process,
   wherein a processor coupled to a memory device performs the receiving the event message, the receiving the one or more content sources, the selecting, and the displaying,
   wherein the content source is selected from the one or more content sources that are user chosen, and based on timing sensitivity of the content source and priority ranking of the content sources,
   the priority ranking of the content sources determined by:
      identifying keywords in an event specified in an electronic calendar;
      searching for the identified keywords in the content sources;
      ranking the content sources according to a number of the identified keywords found in the content sources,
   wherein the timing sensitivity determined based on characteristics of the content sources, wherein email content source is determined to have higher timing sensitivity than a web site content source comprising a video clip.

2. The method according to claim 1, wherein the one or more content sources comprises at least one content source selected from the group consisting of:
   an email client software;
   at least one social network;
   at least one web site that provides one or more video clips or one or more audio clips;
   at least one blog site;
   at least one document repository; and
   a software application or a file in the client device.

3. The method according to claim 1, wherein the selecting the content source comprises:
   sending a control signal to the client device that instructs the client device to access at least one of the one or more content sources.

4. The method according to claim 1, wherein the receiving the one or more content sources comprises:
   enabling the user to choose the one or more content sources; and
   enabling the user to register the one or more chosen content sources to a computing system associated with the loading process or an external service associated with the loading process.

5. The method according to claim 1, wherein the selecting the content source further comprises:
   ranking the one or more content sources according to determined priorities; and
   wherein the selected content source is a content source with a highest rank.

6. The method according to claim 5, wherein the user determines the priorities among the one or more content sources.

7. The method according to claim 5, wherein the priorities are determined further based on a criterion selected from the group consisting of:
   an upcoming meeting associated with the user;
   an upcoming deadline associated with the user; and
   user's pattern that the user accesses one or more of the content sources.

8. The method according to claim 1, wherein the selecting the content source comprises:
   determining one or more factors associated with the one or more content sources;
   calculating, based on the determined factors, a score of each content source;
   ranking the one or more content sources according to the calculated score,
   wherein the selected content source is a content source with a highest calculated score.

9. The method according to claim 8, wherein the factors comprises:
   a time period available for displaying a content, user's reading speed, the priorities among the one or more content sources, complexity of the one or more contents, user's reading habits, mood or health state of the user, and contents being viewed by other users.

10. The method according to claim 8, wherein the calculating the score comprises:

assigning a weight to each factor;
rating the each factor of the each content source;
multiplying a rating by the assigned weight of a corresponding factor; and
summing each result of the multiplication.

11. The method according to claim 9, wherein the time period available for displaying is determined by:
detecting the start of the loading process;
determining a total file size associated with the loading process;
measuring a file size being processed within a pre-determined time period of the loading process; and
determining the available time period by computing (the total file size÷the measured file size)×the pre-determined time period.

12. The method according to claim 1, wherein the loading process comprises at least one loading process selected from the group consisting of:
uploading a file from the client device to a computing system;
downloading a file into the client device;
installing software in the client device;
booting up the client device;
loading a web page in the client device;
any other idle time of the client device;
opening a software application in the client device; and
performing a task, in the client device, which does not allow the user to interact with the client device or a software application which performs the task or both the client device and the software application.

13. A system for customizing a loading message to be displayed during a loading process, the system comprising:
a memory device;
a processor coupled to the memory device, wherein the processor is configured to perform:
receiving, from a client device used by a user, an event message that indicates a start of the loading process;
receiving, from the client device, one or more content sources;
selecting a content source among the one or more content sources; and
displaying a content from the selected content source to the user during the loading process,
wherein the priorities of the one or more content sources are determined based on criteria comprising at least a subject of the loading process and one or more content sources provided to other users during the same loading process;
wherein the content source is selected from the one or more content sources that are user chosen, and based on timing sensitivity of the content source and priority ranking of the content sources,
the priority ranking of the content sources determined by:
identifying keywords in an event specified in an electronic calendar;
searching for the identified keywords in the content sources;
ranking the content sources according to a number of the identified keywords found in the content sources,
wherein the timing sensitivity determined based on characteristics of the content sources, wherein email content source is determined to have higher timing sensitivity than a web site content source comprising a video clip.

14. The system according to claim 13, wherein the one or more content sources comprises at least one content source selected from the group consisting of:
an email client software;
at least one social network;
at least one web site that provides one or more video clips or one or more audio clips;
at least one blog site;
at least one document repository; and
a software application or a file in the client device.

15. The system according to claim 13, wherein in order to receive the one or more content sources, the processor is configured to perform:
enabling the user to choose the one or more content sources; and
enabling the user to register the one or more chosen content sources to a computing system associated with the loading process or an external service associated with the loading process.

16. The system according to claim 13, wherein in order to select the content source, the processor is further configured to perform:
ranking the one or more content sources according to determined priorities; and
wherein the selected content source is a content source with a highest rank.

17. The system according to claim 13, wherein in order to select the content source, the processor is further configured to perform:
determining one or more factors associated with the one or more content sources;
calculating, based on the determined factors, a score of each content source;
ranking the one or more content sources according to the calculated score,
wherein the selected content source is a content source with a highest calculated score.

18. The system according to claim 17, wherein the factors comprises:
a time period available for displaying a content, user's reading speed, the priorities among the one or more content sources, complexity of the one or more contents, user's reading habits, mood or health state of the user, and contents being viewed by other users.

19. A non-transitory computer program product for customizing a loading message to be displayed during a loading process, the computer program product comprising a computer readable storage medium, the computer readable storage medium readable by a processing circuit and storing instructions run by the processing circuit for performing a method, said method steps comprising:
receiving, from a client device used by a user, an event message that indicates a start of the loading process;
receiving, from the client device, one or more content sources;
selecting a content source among the one or more content sources;
determining priorities among the one or more content sources, wherein the priorities are determined based on criteria comprising at least a subject of the loading process and one or more content sources provided to other users during the same loading process; and
displaying a content from the selected content source to the user during the loading process,
wherein the content source is selected from the one or more content sources that are user chosen, and based on timing sensitivity of the content source and priority ranking of the content sources, the priority ranking of the content sources determined by:
  identifying keywords in an event specified in an electronic calendar;
  searching for the identified keywords in the content sources;
  ranking the content sources according to a number of the identified keywords found in the content sources,
wherein the timing sensitivity determined based on characteristics of the content sources, wherein email content source is determined to have higher timing sensitivity than a web site content source comprising a video clip.

20. The computer program product according to claim 19, wherein the selecting the content source comprises:
  determining one or more factors associated with the one or more content sources;
  calculating, based on the determined factors, a score of each content source;
  ranking the one or more content sources according to the calculated score,
  wherein the selected content source is a content source with a highest calculated score.

\* \* \* \* \*